March 19, 1935.  W. R. SMITTLE  1,995,109
PIPE JOINT
Filed Feb. 18, 1933
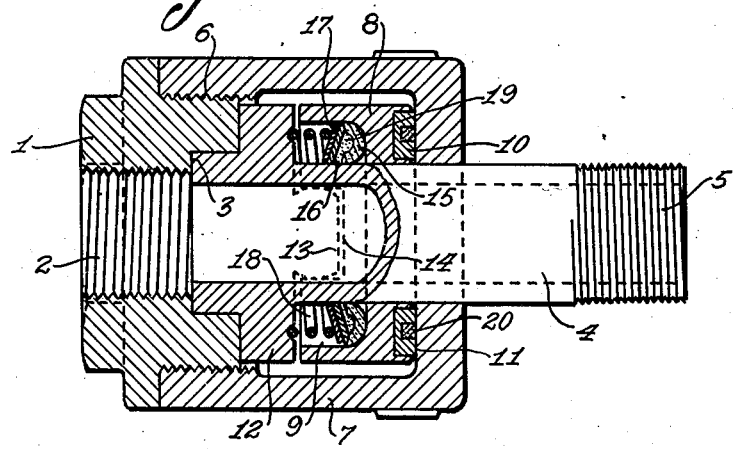
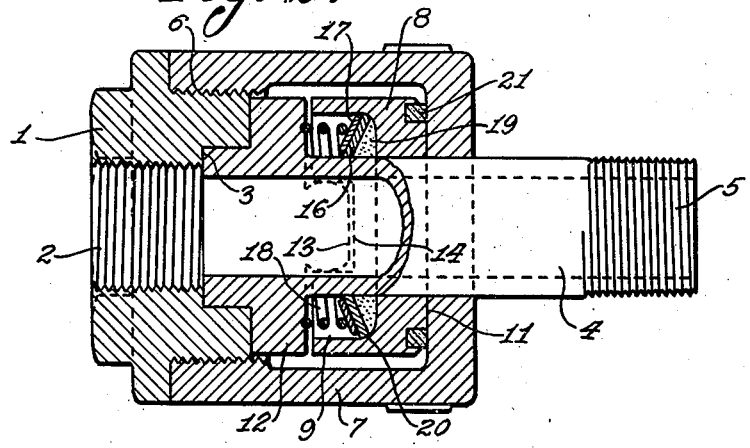
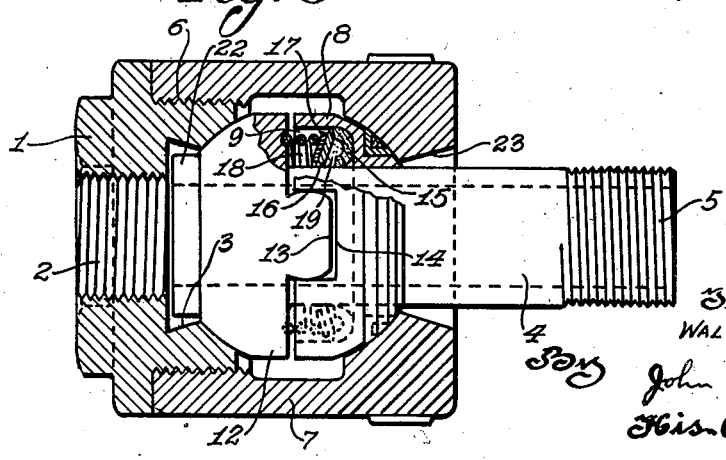
Inventor:
WALTER R. SMITTLE,
By John H. Brininger
His Attorney.

Patented Mar. 19, 1935

1,995,109

UNITED STATES PATENT OFFICE 1,995,109

PIPE JOINT

Walter R. Smittle, St. Louis, Mo.

Application February 18, 1933, Serial No. 657,347

16 Claims. (Cl. 285—9)

This invention pertains to pipe joints and more particularly to that type of flexible joint in which the parts may swivel with respect to each other.

One of the objects of this invention is to provide a swivel pipe joint with packing means, such as will be tight without exerting excessive pressure on the relatively movable parts.

Another object is to provide such a joint which will remain tight during a wide range of temperatures.

Another object is to provide such a joint which will be durable and which will maintain its high sealing qualities for a long time.

Another object is to provide such a swivel joint in which the parts are rigidly supported though capable of relative movement.

Further objects will appear from the following description taken in connection with the accompanying drawing, in which:

Figure 1 is a longitudinal sectional view of a pipe joint embodying this invention;

Figure 2 is a similar view showing a slightly modified form; and

Figure 3 is a similar view of a ball joint embodying this invention.

Referring to the drawing, 1 designates a conduit member which may be provided with threads 2, or other means for attachment to a pipe or conduit. The member 1 forms one of the relatively movable members of this pipe joint. The member 1 is provided with an internal annular seat 3 adapted to receive the end of a second conduit member 4, said end being fitted to swivel in the seat 3. The member 4 is also provided with threads 5, or other suitable means, for attachment to a pipe or conduit. The member 1 is provided with external threads 6 on which may be screwed an outside casing 7 which extends outwardly from the member 1 to overlap the member 4.

Within the casing 7 there is loosely mounted on the member 4 a sleeve 8. This sleeve 8 has an enlarged annular recess 9 so that it has a bearing on the member 4 for only a relatively limited portion of its length. At this point, however, the fit is comparatively loose so that the sleeve may rock to a certain extent with respect to the member 4. The sleeve 8 is provided at its outer end with an annular recess in which is cast a bearing face 10 of lead or other suitable bearing material. It has been found that lead provides a very good bearing for this purpose. The facing 10 is ground flat on its outer face to engage a similarly ground face 11 on the inner surface of the end wall of the casing 7. The facing 10 is adapted to make sealing contact with the face 11 while at the same time being rotatable thereon. The member 4 has formed or mounted thereon a collar 12 provided with an outwardly projecting dog 13 adapted to engage a recess 14 in the end of the sleeve 8. The lateral edges of the dog 13 are curved as shown in the drawing so as to permit a rocking movement of the sleeve 8 relatively thereto. The fit of the dog 13 in the recess, however, is quite snug so as to allow practically no lateral play. This connection serves to anchor the sleeve 8 for rotary movement with the inner member 4.

Mounted within the recess 9 is a soft packing ring 15 which may be V-shape or channel shape and which serves to provide a seal between the sleeve 8 and the inner member 4. In order to provide additional security in the seal a second sealing member is provided in the form of a flexible conical ring 16. This ring may be constructed of rubber or other resilient packing material and may be dimensioned with its inner bore a tight fit on the member 4 so that a secure seal is provided between this ring and the member 4. Such a ring may be punched flat and takes its conical form when forced on the member 4. This conical ring 16 is positioned so that its outer rim bears against the outer rim of the packing ring 15, as illustrated in Figure 1. A conical metallic ring 17 is then placed against the packing ring 16 and a spring 18 is interposed between this ring and the collar 12. The spring 18 provides pressure acting through the metallic supporting ring 17 to force the ring 16 against the ring 15. The conditions are such that the inner rim of the ring 16 makes a tight seal with the member 4 while the ring is flexible so that its outer rim may be forced against the outer rim of the packing ring 15 by the pressure of the spring 18. The supporting ring 17 is preferably formed so that its pressure is delivered mostly to the outer portion of the ring 16. It will be seen that this provides an effective seal between the sleeve 8 and the inner member 4. The bearing of the inner rim of the ring 16 is tight and may be practically permanent. Its outer rim is flexible so that it may move slightly to permit the sleeve 8 to adjust itself to the bearing of the facing 10 on the face 11 without danger of breaking the seal. Accordingly a secure and flexible seal is provided between the sleeve 8 and the member 4. As the sleeve is locked for rotary movement with the member 4 when the joint flexes all relative movement between the two swiveling parts takes place at the face 11. This is an accurately ground bearing face to which a tight seal may be maintained by the pressure of the spring 18. The member 4 is supported at two points, namely in the recess 3 and where it passes through the outer wall of the casing 7. Accordingly no appreciable flexure is permitted between the parts 1 and 4, although they are free to swivel with respect to each other.

It has been further found that this joint remains tight under widely varying conditions and temperatures. As a steam joint it has been found to be thoroughly reliable both hot and cold and to prevent leakage of water of condensation and the like.

If desired, the space between the rings 15 and 16 may be packed with graphite lubricant 19, or other suitable material.

In the embodiment of Figure 2 the packing ring 15 has been omitted and the ring 16 is caused to bear against an inner tapered surface 20 of the sleeve 8. In this case the graphite lubricant 19 may be placed between the ring 16 and the sleeve 8.

It has been found that an improved seal may be obtained at the faces 10 and 11 if the bearing face for the gland 8 is made up of a plurality of different materials. Accordingly in Figure 1 there is inset in the bearing 10 of lead a ring 20 of leather. In Figure 2 the gland 8 has a bearing face formed thereon to engage the face 11 and inset into the face of the gland is a ring of carbon 21. As the gland 8 is usually made of brass, or the like, this arrangement gives a composite face of brass and carbon. Various other combinations of these materials may be made. For instance, in the structure of Figure 1 the material of the gland 8 may be carried out to the bearing face within the inner radius of the ring 10 so that the material of the gland also forms a part of the bearing face.

It is believed that the employment of different materials for the bearing face has the effect of preventing the formation of a continuous film of the liquid between the two bearing faces, although this is only a theory and the invention is, of course, not to be limited thereby.

In Figure 3 the invention is illustrated as applied to a universal joint or so-called ball joint. The structure here is the same as in the previous figures, except that the bearing faces are spherical so that the inner member may flex in any direction as well as swivel in the member 7. It will be noted that in this case the seat 3 is somewhat enlarged and its wall made angular so that the extension 22 of the member 4 may contact with the walls of the seat 3 at the same time that the outer projecting end of the member 4 contacts with the walls 23 of the opening in the member 7. This structure provides a support at both ends of the member 4 in its limiting position so as to avoid any strain on the bearing surfaces when the member 4 is pulled over to its limiting position.

It will be seen that this invention provides a simple and secure packing for a swiveling pipe joint. A movable sealing engagement is maintained at the face 11 by the pressure of the spring 18. This seal is the more surely maintained because the sleeve 8 is loose on the member 4 and can adjust itself to a perfect bearing. The seal between the sleeve and the member 4 is flexible and yet perfectly secure. The ring 16 allows for slight movement of the sleeve 8 with reference to the member 4 without danger of breaking the seal at either its outer or its inner rim. Accordingly these portions of the ring 16 may become permanently adhesive to their engaging parts without in any way detracting from the security of the joint.

While this invention has been described as a unitary structure it is understood that individual features or subcombinations thereof may be employed without reference to other features or the complete combination and that the employment of such individual features or subcombinations is contemplated by this invention and within the scope of the appended claims. It is obvious that various changes may be made, within the scope of the appended claims, in the details of construction without departing from the spirit of this invention; it is to be understood, therefore, that this invention is not limited to the specific details shown and/or described.

Having thus described the invention, what is claimed is:

1. A flexible pipe joint, comprising, a pair of relatively swiveling conduit members adapted for connection to pipes, a casing adapted for connection to one of said members to overlap the other and having an end bearing face, a packing gland loosely mounted on said second member but secured to rotate therewith within said casing and having a bearing face adapted for sealing engagement with said first bearing face, a sealing ring between said gland and said second member adapted for flexure at its outer rim to permit movement of said gland along said member, and yielding means engaging said ring near its outer rim to maintain the same in sealing engagement.

2. A flexible pipe joint, comprising, a pair of relatively swiveling conduit members adapted for connection to pipes, a casing adapted for connection to one of said members to overlap the other and having an end bearing face, a packing gland loosely mounted on said second member but secured to rotate therewith within said casing and having a bearing face adapted for sealing engagement with said first bearing face, and a concavo-convex sealing ring bearing at its outer portion on said gland and at its inner portion on said second member.

3. A flexible pipe joint, comprising a pair of relatively swiveling conduit members adapted for connection to pipes, a casing adapted for connection to one of said members to overlap the other and having an end bearing face, a packing gland loosely mounted on said second member but secured to rotate therewith within said casing and having a bearing face adapted for sealing engagement with said first bearing face, and a pair of flexible sealing rings between said gland and said second member mutually supporting one another in sealing engagement.

4. A flexible pipe joint, comprising, a pair of relatively swiveling conduit members adapted for connection to pipes, a casing adapted for connection to one of said members to overlap the other and having an end bearing face, a packing gland loosely mounted in said second member but secured to rotate therewith within said casing and having a bearing face adapted for sealing engagement with said first bearing face, and a pair of flexible sealing rings between said gland and said second member in mutual engagement at their outer rims.

5. A flexible pipe joint, comprising, a pair of relatively swiveling conduit members adapted for connection to pipes, a casing adapted for connection to one of said members to overlap the other and having an end bearing face, a packing gland loosely mounted in said second member but secured to rotate therewith within said casing and having a bearing face adapted for sealing engagement with said first bearing face, and a pair of flexible sealing rings between said gland and said second member in mutual engagement at their outer rims adapted to provide a lubricant receiving cavity therebetween.

6. A flexible pipe joint, comprising, a pair of relatively swiveling conduit members adapted for connection to pipes, a casing adapted for connection to one of said members to overlap the other and having an end bearing face, a packing gland loosely mounted on said member but secured to rotate therewith within said casing and having a bearing face adapted for sealing engagement with said first bearing face, a sealing ring having outer and inner flanges spaced radially from each other, and a second sealing ring positioned and adapted to apply sealing pressure to the outer flange of said first ring.

7. A flexible pipe joint, comprising, a pair of relatively swiveling conduit members adapted for connection to pipes, a casing adapted for connection to one of said members to overlap the other and having an end bearing face, a packing gland loosely mounted on said member but secured to rotate therewith within said casing and having a bearing face adapted for sealing engagement with said first bearing face, a sealing ring having outer and inner flanges spaced radially from each other, and a conical sealing ring positioned and adapted to apply sealing pressure to the outer flange of said first ring.

8. A flexible pipe joint, comprising, a pair of relatively swiveling conduit members adapted for connection to pipes, a casing adapted for connection to one of said members to overlap the other and having an end bearing face, a packing gland loosely mounted on said second member but secured to rotate therewith within said casing and having a bearing face adapted for sealing engagement with said first bearing face, and packing means providing a seal between said gland and said second member including a flexible concavo-convex ring having a sealing bearing at its inner and outer peripheries.

9. A flexible pipe joint, comprising, a pair of relatively swiveling conduit members adapted for connection to pipes, a casing adapted for connection to one of said members to overlap the other and having an end bearing face, a packing gland loosely mounted on said second member but secured to rotate therewith within said casing and having a bearing face adapted for sealing engagement with said first bearing face, a concavo-convex ring having sealing engagement at its inner periphery with said second member, and flexible at its outer portion to provide yielding sealing pressure on said gland.

10. A flexible pipe joint, comprising, a pair of relatively swiveling conduit members adapted for connection to pipes, a casing adapted for connection to one of said members to overlap the other and having an end bearing face, a packing gland loosely mounted on said second member and slidably secured to rotate therewith within said casing and having a bearing face adapted for sealing engagement with said first bearing face, a packing member adapted for fixed sealing engagement with said gland and said second member respectively and axially flexible therebetween.

11. A flexible pipe joint, comprising, a pair of relatively swiveling conduit members adapted for connection to pipes, a casing adapted for connection to one of said members to overlap the other and having an end bearing face, a packing gland loosely mounted on said second member, but having a flexible interlock with the same so as to rotate therewith within said casing and having a bearing face adapted for sealing engagement with said first bearing face, and a concavo-convex packing adapted for axial flexure providing a seal between said gland and said second member, said packing being adapted for fixed engagement with each of said latter parts.

12. A packing of the character described, comprising, a pair of relatively swiveling members, a casing on one of said members overlapping the other and having an end bearing face, a packing gland loosely mounted on said second member but secured to rotate therewith within said casing, a composite bearing facing for said gland adapted for sealing engagement with said first bearing face providing distinct contact areas of different facing materials, and flexible sealing means between said gland and said second member.

13. A packing of the character described, comprising, a pair of relatively swiveling members, a casing on one of said members overlapping the other and having an end bearing face, a packing gland loosely mounted on said second member but secured to rotate therewith within said casing, a bearing facing for said gland comprising a plurality of different materials forming permanently different portions of the facing, and flexible sealing means between said gland and said second member.

14. A packing of the character described, comprising, a pair of relatively swiveling members, a casing on one of said members overlapping the other and having an end bearing face, a packing gland loosely mounted on said second member but secured to rotate therewith within said casing, a composite bearing facing for said gland adapted for sealing engagement with said first bearing face, said facing being composed of lead and leather, and flexible sealing means between said gland and said second member.

15. A packing of the character described, comprising, a pair of relatively swiveling members, a casing on one of said members overlapping the other and having an end bearing face, a packing gland loosely mounted on said second member but secured to rotate therewith within said casing, a composite bearing facing for said gland adapted for sealing engagement with said first bearing face providing distinct contact areas of different facing materials, said facing being composed of brass and carbon, and flexible sealing means between said gland and said second member.

16. A flexible pipe joint, comprising, a casing member, an inner conduit member, said members having matching spherical bearing faces permitting universal relative movement thereof, said inner member having a projection beyond its inner spherical face, and said casing member having an inner stop ring engageable by said projection and an outer stop ring simultaneously engageable by said conduit member whereby said inner member is positively supported at its limiting positions.

WALTER R. SMITTLE.